United States Patent
Sakaguchi et al.

(10) Patent No.: US 8,134,599 B2
(45) Date of Patent: Mar. 13, 2012

(54) SCANNING IMAGE DISPLAY APPARATUS

(75) Inventors: Ryuichi Sakaguchi, Utsunomiya (JP); Shuichi Kobayashi, Yokohama (JP)

(73) Assignee: Canon Kabushiki Kaisha (JP)

( * ) Notice: Subject to any disclaimer, the term of this patent is extended or adjusted under 35 U.S.C. 154(b) by 1134 days.

(21) Appl. No.: 11/949,286

(22) Filed: Dec. 3, 2007

(65) Prior Publication Data

US 2008/0129892 A1 Jun. 5, 2008

(30) Foreign Application Priority Data

Dec. 5, 2006 (JP) ................................. 2006-328800

(51) Int. Cl.
*H04N 3/08* (2006.01)

(52) U.S. Cl. ........ 348/205; 348/203; 348/581; 348/744; 348/747

(58) Field of Classification Search .................. 348/203, 348/205, 581, 744, 747, 759, 777; 359/201.2, 359/212.1, 212.2, 213.1
See application file for complete search history.

(56) References Cited

U.S. PATENT DOCUMENTS

| | | | | |
|---|---|---|---|---|
| 5,546,128 A * | 8/1996 | Nakagakiuchi et al. | ...... | 348/362 |
| 5,694,235 A * | 12/1997 | Kajiki | ........................ | 359/202.1 |
| 5,777,804 A * | 7/1998 | Nakamura et al. | ............ | 359/727 |
| 6,020,937 A * | 2/2000 | Bardmesser | ................... | 348/756 |
| 6,727,489 B2 * | 4/2004 | Yano | .............................. | 250/221 |
| 6,945,652 B2 * | 9/2005 | Sakata et al. | ..................... | 353/30 |
| 7,108,379 B2 * | 9/2006 | Tan | ................................. | 353/69 |
| 7,461,939 B2 * | 12/2008 | Allen et al. | ..................... | 353/30 |
| 2005/0231651 A1 * | 10/2005 | Myers et al. | .................. | 348/744 |

FOREIGN PATENT DOCUMENTS

JP 2005-107456 4/2005

* cited by examiner

*Primary Examiner* — Pankaj Kumar
*Assistant Examiner* — Timothy Newlin
(74) *Attorney, Agent, or Firm* — Rossi, Kimms & McDowell LLP

(57) ABSTRACT

A scanning image display apparatus includes: a scanning unit rotating a mirror to scan a light flux from a light source; an input unit to input a display condition of an image; and a controller changing a rotation angle of the mirror in the scanning unit in accordance with a signal from the input unit. According to the scanning image display apparatus, the display condition (e.g., size, aspect ratio) of the image can be changed without using trimming.

10 Claims, 10 Drawing Sheets

SCANNING IMAGE DISPLAY APPARATUS

BACKGROUND OF THE INVENTION

The present invention relates to a scanning image display apparatus that displays an image by scanning a light flux from a light source.

As a scanning display apparatus described above, an apparatus has been disclosed in Japanese Patent Laid-Open No. 2005-107456, for example. This scanning display apparatus displays (or projects) an image on a screen using a rotating scanning mirror to two-dimensionally scan a laser beam modulated in accordance with an image signal.

In the scanning image display apparatus that scans the laser beam, the intensity of the laser beam is dispersed over the entire scanning region of the laser beam. Thus, the laser beam requires an intensity by which an image can be displayed in the entire scanning region.

On the other hand, from the viewpoint of the classification of laser products specified by a standard (e.g., JIS C 6802), the illuminance of the laser beam must be equal to or lower than a regulation value at a laser beam exit window (exit aperture) which is provided in a housing of the apparatus and through which the laser beam passes.

Thus, in the apparatus disclosed in Japanese Patent Laid-Open No. 2005-107456, the exit window is provided on a screen at a position where the laser beam enters with an intensity equal to or lower than a certain value.

In conventional scanning image display apparatuses such as one disclosed in Japanese Patent Laid-Open No. 2005-107456, the rotation angle of the scanning mirror, that is a scannable angle of the light flux is fixed.

Thus, in order to change the size of the displayed image, it is necessary that the projection distance from the apparatus to the screen is changed or the light flux from the light source is caused to impinge on the mirror only in part of the rotation angle range of the mirror (i.e., the light flux from is trimmed).

However, it is difficult that the projection distance is changed in some places where the apparatus is provided, which may prevent a desired image size from being obtained. Furthermore, when the rotation angle of the scanning mirror is fixed, only an image having a specific aspect ratio can be displayed.

Furthermore, even when the image size is reduced by the trimming, the rotation angle of the mirror is still wider than an angle at which the light flux is actually scanned for displaying the image. Thus, wasteful power consumption in the scanning unit is caused.

Furthermore, the trimming cuts part of information for the input image signal. Thus, when the image size is changed, the number of displaying pixels is changed. For example, when the image size is reduced, the number of displaying pixels is reduced.

BRIEF SUMMARY OF THE INVENTION

The present invention provides a scanning image display apparatus that can change a display condition such as an image size and an aspect ratio without using trimming.

According to an aspect, the present invention provides a scanning image display apparatus that includes: a light source; a scanning unit rotating a mirror to scan a light flux from the light source; an input unit operated by a user to input a display condition of an image; and a controller changing a rotation angle of the mirror in the scanning unit in accordance with a signal from the input unit.

According to another aspect, the present invention provides an image display system including the scanning image display apparatus and an image supply apparatus supplying an image signal to the scanning image display apparatus.

Other aspects of the present invention will become apparent from the following description and the attached drawings.

DETAILED DESCRIPTION OF THE PREFERRED EMBODIMENTS

Exemplary embodiments of the present invention will hereinafter be described with reference to the accompanying drawings.

Embodiment 1

Figure 1A:
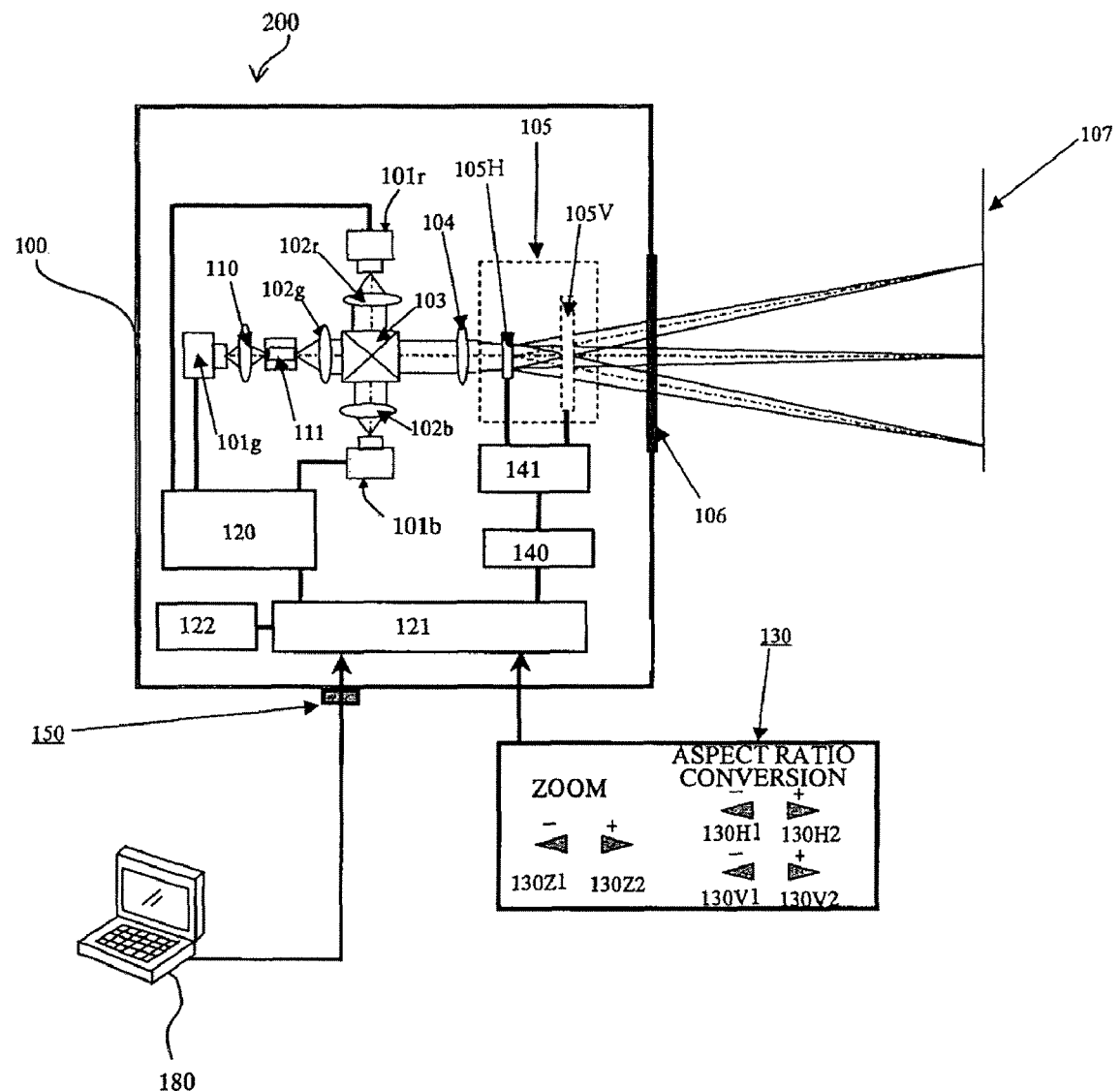
FIG. 1A is a block diagram showing a scanning image display apparatus that is Embodiment 1 of the present invention.

FIG. 1A shows the configuration of a scanning image display apparatus 200 that is Embodiment 1 of the present invention.

Reference numeral 100 denotes a housing of this apparatus 200 that stores therein components described below. Reference numerals 101*r*, 101*b* and 101*g* denote semiconductor laser devices constituting a laser light source. Reference numeral 101*r* denotes a red semiconductor laser device. Reference numeral 101*b* denotes a blue semiconductor laser device. Reference numeral 101*g* denotes an infrared semiconductor laser device.

Although a case where a light source constituted by semiconductor laser devices is used will be described in this embodiment, the light source is not limited thereto. For example, the intensity of a laser beam continuously oscillated from a solid-state laser device may be modulated by an external modulator in accordance with an image signal. Alternatively, an LED also may be used as a light source.

The laser devices 101*r*, 101*b* and 101*g* are electrically connected to a light-source driving circuit 120. Reference numeral 105 denotes a scanning unit that is electrically connected to a scanning unit control circuit 141. Reference numeral 140 denotes a rotation-angle setting circuit that is electrically connected to the scanning unit control circuit 141. The light-source driving circuit 120 and the rotation-angle setting circuit 140 are connected to a main controller 121.

Based on an image signal (video signal) supplied from an image supply apparatus 180, the main controller 121 synchronously controls the laser devices 101r, 101b and 101g and a scanning unit 105 via the light-source driving circuit 120 and the scanning unit control circuit 141. As a result, an image in accordance with the image signal is projected and displayed on a screen (display surface) 107.

The image supply apparatus 180 includes a personal computer, a DVD player, a video cassette recorder, a television tuner, a mobile phone, PDA, a camcorder and the like. The scanning image display apparatus 200 and the image supply apparatus 180 constitute an image display system. Although not shown in the drawings, this also applies to embodiments described later.

Red and blue diverging laser light fluxes emitted from the laser light source (red and blue semiconductor laser devices) 101r and 101b are converted by collimator lenses 102r and 102b to collimated (parallel) light fluxes, respectively.

The diverging light flux emitted from the infrared semiconductor laser device 101g enters a LN ($LiNbO_3$) crystal 111 via a collective lens 110. The crystal 111 is a wavelength conversion element using polarization inversion. Then, the diverging light flux is converted to a green laser light flux that is the second harmonic wave.

The green laser beam is converted to a collimated (parallel) light flux by a collimator lens 102g.

The red, blue and green collimated (parallel) light fluxes emitted from the collimator lenses 102r, 102b and 102g are synthesized into one light flux by a cross dichroic prism 103 that is a color combining optical element. The light flux emitted through the cross dichroic prism 103 enters the scanning unit 105 via a condensing optical system 104.

Figure 1B:
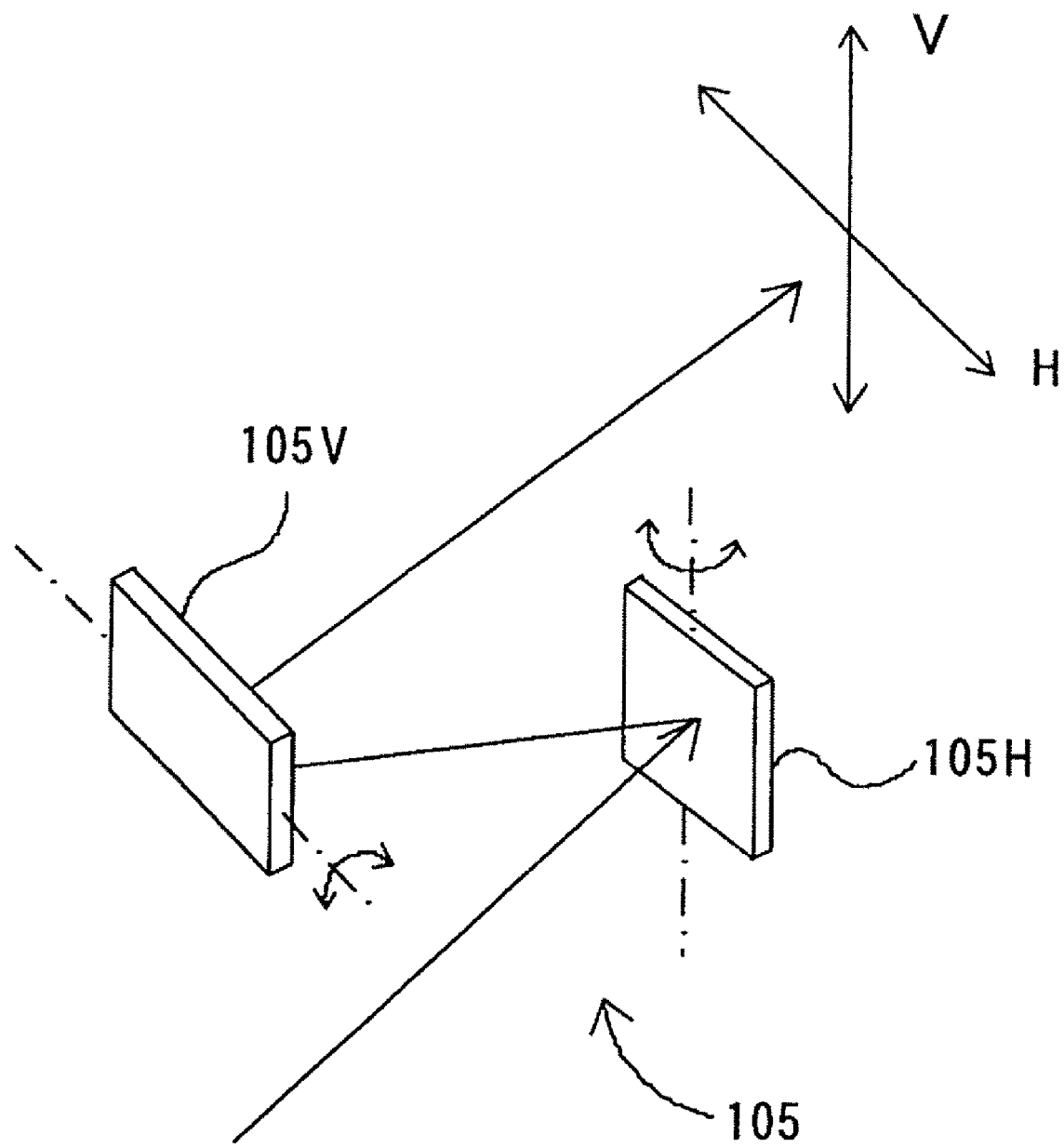
FIG. 1B is a schematic diagram showing the configuration of a scanning unit in the scanning image display apparatus of Embodiment 1.

As shown in FIG. 1B, the scanning unit 105 includes a horizontal scanning mirror 105H and a vertical scanning mirror 105V, which scans the entered laser light flux (laser beam) in two-dimensional directions that are a horizontal direction H and a vertical direction V.

The horizontal scanning mirror 105H is a MEMS (MicroElectroMechanical System) mirror device manufactured by a semiconductor manufacturing technique, which uses an electromagnetic power to reciprocate (or swing) the mirror 105H. A vertical scanning mirror 105V is a galvano mirror.

Both of the horizontal scanning mirror 105H and the vertical scanning mirror 105V also may be MEMS mirror devices. Alternatively, the scanning unit 105 may be constituted by one MEMS mirror device in which one mirror rotates in two-dimensional directions to scan a light flux in the horizontal and vertical directions.

The laser beam scanned by the scanning unit 105 exits to the outside of the housing 100 via an exit window 106 that is provided in the housing 100 and that is an exit aperture through which the laser beam exits (or passes). Then, the laser beam proceeds to the screen 107 that is a display surface.

The exit window 106 is provided with a light-transmitting member such as a parallel flat plate glass, for example.

The collimator lenses 102r, 102b and 102g and the condensing optical system 104 form a spot image with the laser beam from the laser light source (101r, 101b and 101g) on the screen 107. Two-dimensionally scanning the spot image by the scanning unit 105 forms a two-dimensional image on the screen 107.

The main controller 121, the rotation-angle setting circuit 140 and the scanning unit control circuit 141 will be described. The main controller 121, the rotation-angle setting circuit 140 and the scanning unit control circuit 141 serve as a controller.

The image signal from the image supply apparatus 180 is input to the main controller 121 via an image signal input part 150. The main controller 121 reads the aspect ratio of the image (input image) represented by the input image signal. For example, the aspect ratio of 4:3 is used in an NTSC method.

The aspect ratio (4:3) read from the image signal is sent to the rotation-angle setting circuit 140 as information for determining an initial setting value of a rotation angle (hereinafter referred to as a mirror rotation angle) of each mirror in the scanning unit 105.

The rotation-angle setting circuit 140 determines the initial setting values ($\theta H0$, $\theta V0$) of the mirror rotation angle (range) $\theta H$ in the horizontal direction and the mirror rotation angle (range) $\theta V$ in the vertical direction so that the aspect ratio of the displayed image is identical with the aspect ratio of 4:3 of the input image.

In this embodiment, the mirror rotation angles $\theta H$ and $\theta V$ mean total rotation angle ranges in the horizontal direction and the vertical direction of the respective mirrors.

The initial setting values ($\theta H0$, $\theta V0$) of the mirror rotation angles $\theta H$ and $\theta V$ determined by the rotation-angle setting circuit 140 are sent to the scanning unit control circuit 141.

The scanning unit control circuit 141 drives the horizontal scanning mirror 105H with the mirror rotation angle $\theta H0$ and drives the vertical scanning mirror 105V with the mirror rotation angle $\theta V0$. As a result, an image of the aspect ratio of 4:3 is displayed on the screen 107.

In this embodiment, the initial setting values when the distance from the scanning unit 105 to the exit window 106 is 40 mm and the projection distance from the exit window 106 to the screen 107 is 310 mm is $\theta H0=20°$ and $\theta V0=15°$. As a result, an image corresponding to a diagonal size of 12 inches is displayed on the screen 107.

When an input image is a HDTV image having an aspect ratio of 16:9, the rotation-angle setting circuit 140 determines the initial setting value of the mirror rotation angle corresponding to the aspect ratio of 16:9.

As described above, the rotation-angle setting circuit 140 determines the initial setting value of the mirror rotation angle so that an image having an aspect ratio equal to that of an input image can be displayed.

Next, the following section will describe a display condition input unit 130, the rotation-angle setting circuit 140 and the scanning unit control circuit 141 relating to a mirror-rotation-angle-variable function that is a feature of this embodiment.

The display condition input unit 130 is constituted by a display device such as a liquid crystal panel and is electrically connected to the main controller 121.

The display condition input unit 130 includes (or displays) display condition input buttons 130Z1, 130Z2, 130H1, 130H2, 130V1 and 130V2 that are manually operated by a user to input setting values of the size and aspect ratio of the displayed image, which are input display conditions.

The display condition input unit 130 outputs a signal in accordance with the operation of these buttons.

The main controller 121 calculates the mirror rotation angle $\theta H$ in the horizontal direction and the mirror rotation angle $\theta V$ in the vertical direction based on the signal from the display condition input unit 130. The calculated mirror rotation angles $\theta H$ and $\theta V$ are sent to the scanning unit control circuit 141 via the rotation-angle setting circuit 140.

The scanning unit control circuit 141 drives the horizontal scanning mirror 105H and the vertical scanning mirror 105V based on the input mirror rotation angles θH and θV.

That is, based on the signal from the display condition input unit 130, the mirror rotation angle is changed. Specifically, the mirror rotation angle is changed by changing a value of a mirror driving voltage applied to the scanning unit 105.

The display condition input buttons 130Z1 and 130Z2 will be described. The display condition input buttons 130Z1 and 130Z2 are buttons for specifying an enlargement magnification in a "zoom function" for enlarging or reducing the image size while maintaining the aspect ratio of the displayed image.

When the display condition input button 130Z1 is pressed, the displayed image is reduced in size. When the display condition input button 130Z2 is pressed, the displayed image is enlarged in size.

Figure 2:
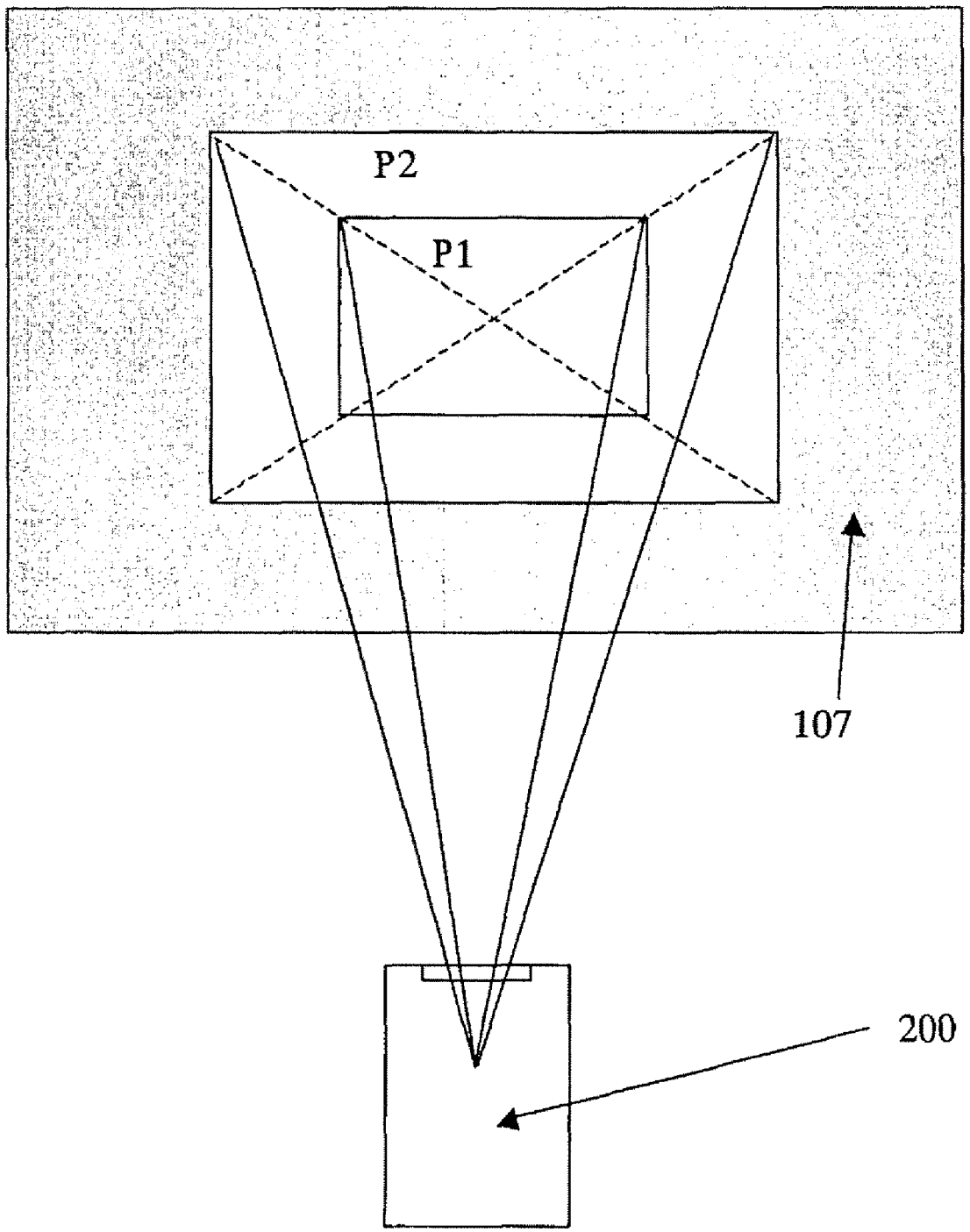
FIG. 2 shows a "zoom function" in the scanning image display apparatus of Embodiment 1.

With reference to FIG. 2, the "zoom function" will be described. In FIG. 2, P1 and P2 represent regions of a two-dimensional image (effective image) displayed on the screen 107 by the scanning image display apparatus 200.

Continuously pressing the display condition input button 130Z2 increases the mirror rotation angles in the horizontal and vertical directions, thereby increasing the scanning angles in the horizontal and vertical directions of the laser beam by the scanning unit 105. As a result, the image region is gradually enlarged from P1 to P2 while maintaining the aspect ratio of P1.

When the display condition input button 130Z1 is continuously pressed from this state, the mirror rotation angles in the horizontal and vertical directions are reduced and thereby the scanning angles in the horizontal and vertical directions of the laser beam by the scanning unit 105 are reduced.

As a result, the image region is gradually reduced from P2 to P1 while maintaining the aspect ratio of P2.

When the pressing of the display condition input buttons 130Z1 and 130Z2 is stopped between P1 and P2, an image having the size at the time is displayed.

As described above, operating the display condition input buttons 130Z1 and 130Z2 enables the user to cause the apparatus 200 to display an image having an arbitrary size without changing the projection distance. Thus, even when the freedom degree of the installation location of the apparatus 200 is small, the image having the arbitrary size can be obtained.

Next, the display condition input buttons 130H1, 130H2, 130V1 and 130V2 will be described. The display condition input buttons 130H1 and 130H2 are buttons for specifying the enlargement magnification of the displayed image in the horizontal direction.

When the display condition input button 130H1 is pressed, the displayed image size is reduced in the horizontal direction. When the display condition input button 130H2 is pressed, the displayed image size is enlarged in the horizontal direction.

The display condition input buttons 130V1 and 130V2 are buttons for specifying the enlargement magnification of the displayed image in the vertical direction. When the display condition input button 130V1 is pressed, the displayed image size is reduced in the vertical direction.

When the display condition input button 130V2 is pressed, the displayed image size is enlarged in the vertical direction.

Figure 3:
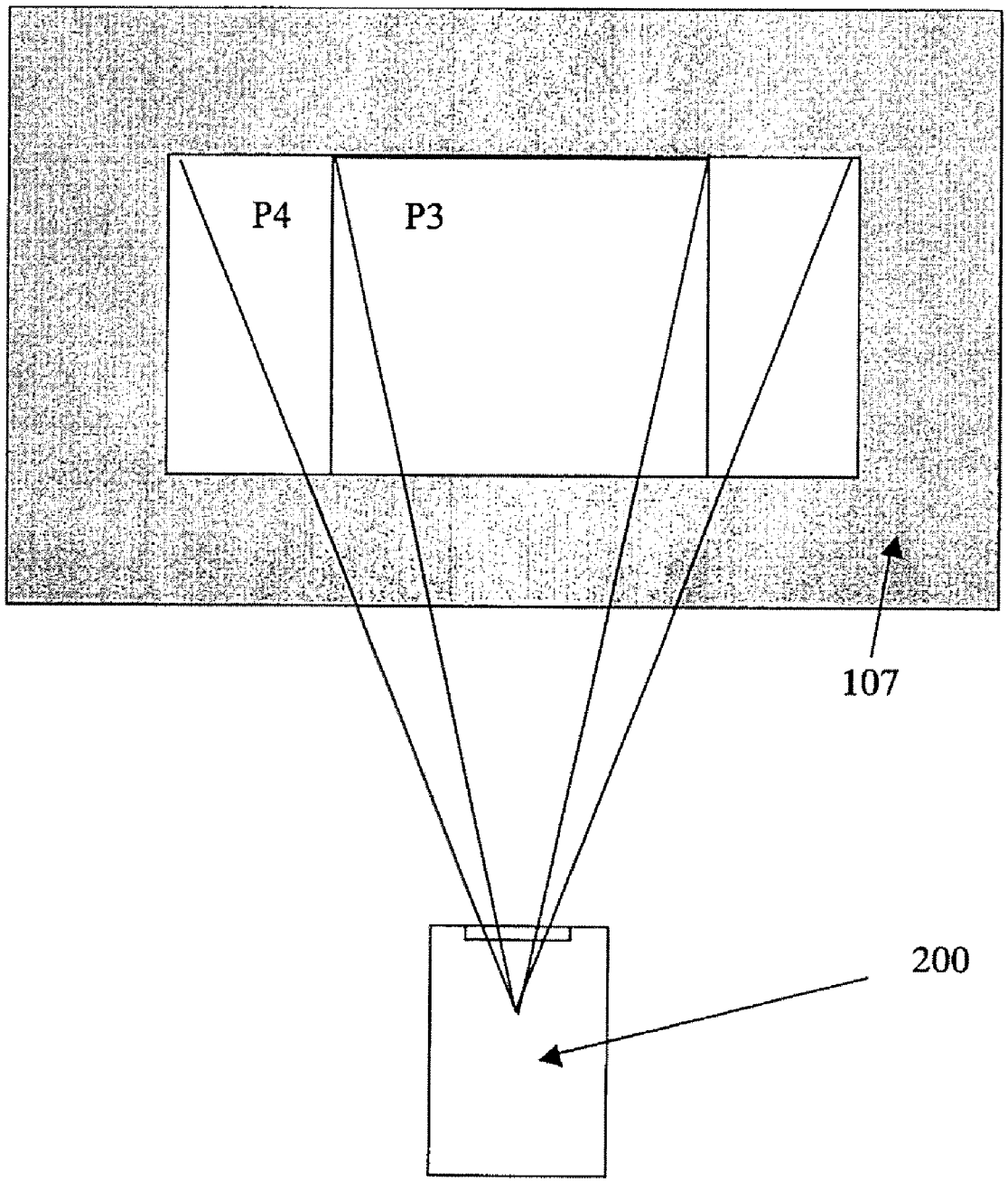
FIG. 3 shows an "aspect-ratio conversion function" in the scanning image display apparatus of Embodiment 1.

With reference to FIG. 3, an "aspect-ratio conversion function" will be described. In FIG. 3, P3 and P4 represent regions of the two-dimensional image (effective image) displayed on the screen 107 by the scanning image display apparatus 200.

When the display condition input button 130H2 is continuously pressed, only the mirror rotation angle in the horizontal direction is increased and thereby the scanning region of the laser beam by the scanning unit 105 is increased only in the horizontal direction.

As a result, the size of the image area is enlarged from P3 to P4 only in the horizontal direction.

When the display condition input button 130H1 is continuously pressed in this state, only the mirror rotation angle in the horizontal direction is reduced and thereby the scanning region of the laser beam by the scanning unit 105 is reduced only in the horizontal direction.

As a result, the size of the image region is gradually reduced in the horizontal direction from P4 to P3.

When the pressing of the display condition input buttons 130H2 and 130H1 is stopped between P3 and P4, an image of the aspect ratio at the time is displayed.

The same is applied to the vertical direction. Specifically, the displayed image also can be enlarged or reduced by an arbitrary magnification by operating the display condition input buttons 130V1 and 130V2. Alternatively, the displayed image also can be enlarged or reduced by an arbitrary magnification in both of the horizontal direction and the vertical direction.

Operating the display condition input buttons 130H1, 130H2, 130V1 and 130V2 as described above enables the user to cause the apparatus 200 to arbitrarily set the aspect ratio of the displayed image. As a result, an image having a general aspect ratio of 4:3 for example can be enlarged to display a wide realistic image having an aspect ratio of 16:9.

The "zoom function" and the "aspect-ratio conversion function" of this embodiment do not mean trimming in which part of information of the image signal is cut. Specifically, these functions change the mirror rotation angle of the scanning unit 105 to change the size and aspect ratio of the image.

Thus, even after the image size is reduced, the image can be displayed with the same number of pixels (image information) as that before the image size is reduced.

The mirror rotation angles θH and θV determined based on the signal from the display condition input unit 130 also can be stored in a memory 122.

For example, when the power source of the scanning image display apparatus 200 is turned off and then restarted, the scanning image display apparatus 200 can immediately operate with the mirror rotation angles θH and θV stored as the previous display condition. As a result, an image having the same size or aspect ratio as the previous one can be displayed even after the restart.

Furthermore, the display condition (the mirror rotation angles θH and θV) stored in the memory 122 also can be reset to the initial setting value by providing an instruction to the main controller 121 through the operation of a memory delete button (not shown).

In this case, the resultant displayed image has the size and aspect ratio corresponding to the initial setting value.

Even when the "zoom function" is used to change the size of the displayed image while maintaining the aspect ratio thereof, the scanning area $S(m^2)$ of the light flux at the exit window 106 and the illuminance $A(lx)$ at the exit window 106 maintain the relationship shown in following expression (1).

In expression (1), $L(mW)$ represents the sum of amounts of the red, blue and green laser light fluxes exiting from the apparatus 200 when a full-white image is displayed.

$$S \times A = L \tag{1}$$

This relationship also applies to the area of the displayed image region on the screen 107 and the illuminance of the displayed image on the screen 107.

Thus, when the displayed image size is enlarged by the "zoom function" (when the scanning area S is increased), the displayed image is dark. When the displayed image size is reduced (when the scanning area S is reduced), the displayed image is bright.

Then, the reduced image size may cause an increased illuminance A at the exit window 106 that exceeds a specified value as the classification condition for laser products required by JIS C 6802 standard, for example.

Therefore, regardless of the size and aspect ratio of the image, it is necessary that the illuminance at the exit window 106 always becomes a value equal to or lower than the specified value.

Accordingly, in this embodiment, a lower limit value is provided for the scanning area $S(m^2)$ at the exit window 106 that is allowed to be reduced by the "zoom function" and "aspect-ratio conversion function. The lower limit value $S0(m^2)$ is determined based on a condition in which the illuminance at the exit window 106 does not exceed a specific value A0(lx).

The lower limit value $S0(m^2)$ is determined as shown in expression (2).

$$S0 = L/A0 \qquad (2)$$

When the scanning area S is reduced to S0, the main controller 121 does not perform processing for reducing the image size (processing for reducing the mirror rotation angle) even though the display condition input buttons 130Z1, 130H1 and 130V1 are operated.

In such a state, the main controller 121 also performs a warning operation to indicate the user that the image size cannot be reduced any more. The warning operation includes the switching of a display of the display condition input unit 130 to a warning display and the generation of warning sound.

As described above, the provision of the lower limit value for the scanning area S at the exit window 106 (i.e., the variable range of the mirror rotation angle) can always limit the illuminance at the exit window 106 to a value equal to or lower than the specific value.

On the other hand, the scanning area S at the exit window 106, that is, an upper limit value of the mirror rotation angle may be determined depending on, for example, the maximum mechanically rotatable angle of the mirror or the shape of the exit window 106 (shape for preventing the scanned laser beam from being interfered by the periphery of the exit window 106).

When the scanning area S reaches the upper limit value, the main controller 121 does not perform processing for enlarging the image size (the processing for increasing the mirror rotation angle) even though the display condition input buttons 130Z2, 130H2 and 130V2 are operated.

The main controller 121 also performs the above warning operation in this state to indicate the user that the image size cannot be enlarged any more.

Figure 4:
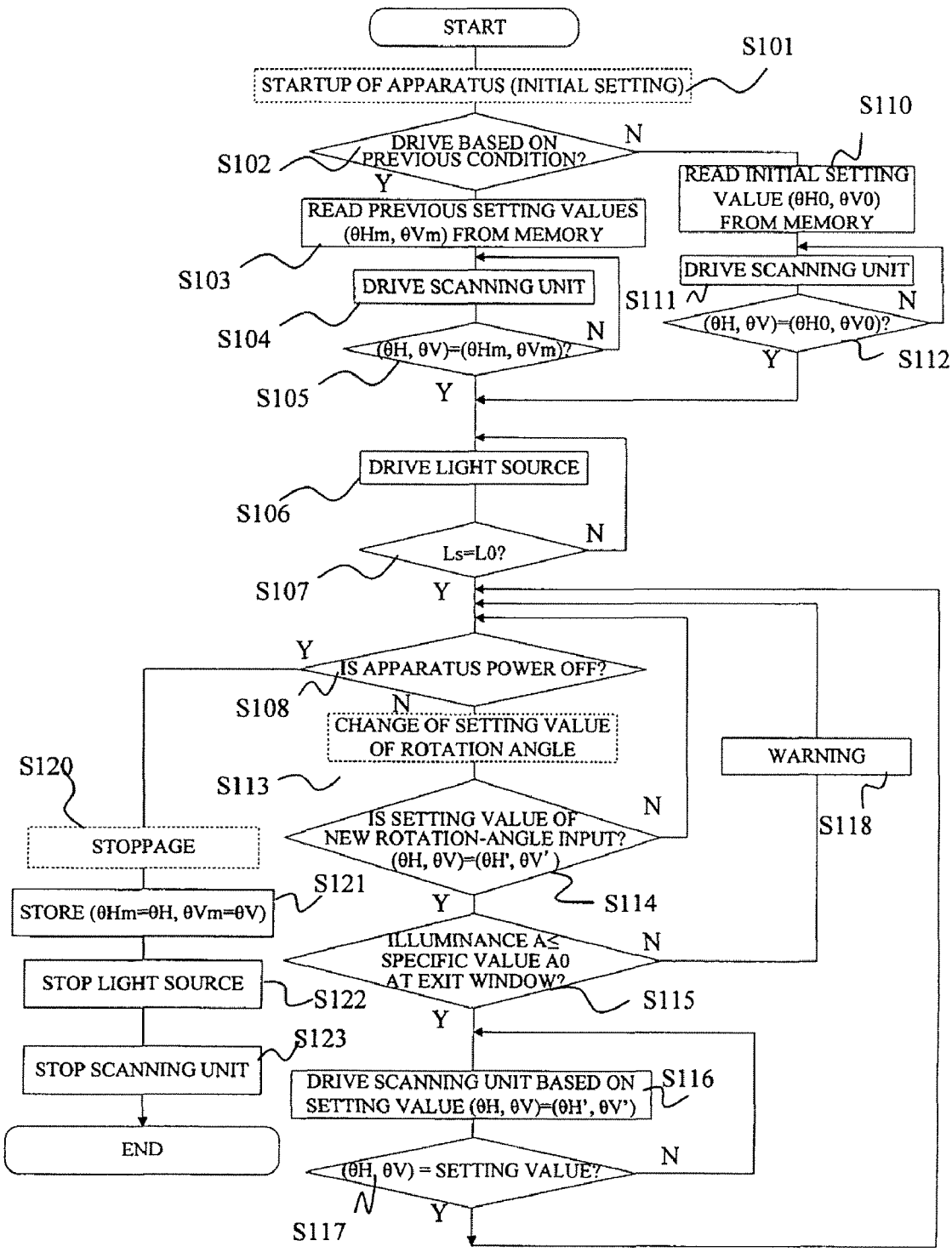
FIG. 4 is a flowchart showing the operation of the scanning image display apparatus of Embodiment 1.

FIG. 4 is a flowchart showing the operation of the main controller 121 in this embodiment. The following section will describe operation sequences of "startup of the apparatus", "change of the setting value of the rotation angle" and "stoppage" in this order with reference to FIG. 4.

When the power is turned on by an operation of a power switch (not shown), the main controller 121 enters the sequence of "startup of the apparatus" in Step 101 (Step is abbreviated as S in the drawing).

In Step 1, a display device constituting the display condition input unit 130 is caused to display a message asking the user to select whether or not the image is displayed based on the previous display condition.

The user selects whether the image is displayed based on the previous display condition or the image is displayed based on a condition corresponding to the initial setting value determined as the specification of the apparatus 200 by selecting a selection button (not shown) (Step 102).

The initial setting value determined as the specification is stored in the memory 122 in the apparatus 200.

When the image is displayed based on the previous display condition, the main controller 121 reads the setting values (θHm, θVm) of the previous mirror rotation angle from the memory 122 (Step 103). Then, the main controller 121 sends the setting values to the scanning unit control circuit 141 to cause it to drive the scanning unit 105 based on (θH, θV)= (θHm, θVm) (Step 104).

Next, the main controller 121 confirms whether or not the scanning unit 105 is driven based on (θH, θV)=(θHm, θVm) (Step 105). When the scanning unit 105 is driven based on (θHm, θVm), the main controller 121 proceeds to Step 106. When the scanning unit 105 is not driven based on (θHm, θVm), the main controller 121 returns to Step 104.

Then, in Step 106, the main controller 121 drives the laser light source with a light amount Ls=L0 (mW) through the light-source driving circuit 120 to display the image on the screen 107. The light amount L0 represents a value that is determined as the specification of the apparatus 200.

Then, the main controller 121 confirms whether or not the light amount of the laser light source is L0 (Step 107). When the light amount of the laser light source is L0, the main controller 121 proceeds to Step 108. When the light amount of the laser light source is not L0, the main controller 121 returns to Step 106 to restart the laser light source.

On the other hand, when the image is not displayed based on the previous display condition in Step 102, the main controller 121 reads the initial setting value (θH0, θV0) of the mirror rotation angle from the memory 122 (Step 110). Then, the main controller 121 sends the initial setting value to the scanning unit control circuit 141 to cause it to drive the scanning unit 105 based on (θH, θV)=(θH0, θV0) (Step 111).

Next, the main controller 121 confirms whether or not the scanning unit 105 is driven based on (θH, θV)=(θH0, θV0) (Step 112). When the scanning unit 105 is driven based on (θH, θV)=(θH0, θV0), the main controller 121 proceeds to Step 106. When the scanning unit 105 is not driven based on (θH, θV)=(θH0, θV0), the main controller 121 returns to Step 111.

Then, the main controller 121 drives the laser light source with a light amount of Ls=L0(mW) to display the image on the screen 107 (Step 106).

Next, in Step 107, the main controller 121 confirms whether or not the light amount of the laser light source is L0. When the light amount of the laser light source is not L0, the main controller 121 returns to Step 106 to restart the laser light source. When the light amount of the laser light source is L0, the main controller 121 proceeds to Step 108.

In Step 108, the main controller 121 determines whether or not the power of the apparatus 200 is turned off by the operation of the power switch. When the power of the apparatus 200 is not turned off, the main controller 121 enters the sequence of "change of the setting value of the rotation angle" (Step 113).

First, the main controller 121 is in a state of waiting for an input of the mirror rotation angle. Then, the main controller 121 determines whether or not a zoom instruction or an aspect ratio changing instruction generated by the operation of the display condition input button in the display condition input unit 130 is input (Step 114).

When the zoom instruction or the aspect ratio changing instruction is input, the main controller 121 causes the rotation-angle setting circuit 140 to calculate a new mirror rotation angle (θH', θV') in accordance with the instruction.

Next, the main controller 121 calculates the illuminance A at the exit window 106 when the scanning unit 105 is driven with the setting value (θH', θV') of the new mirror rotation angle.

This calculation is performed using an expression obtained by modifying expression (1).

$$A = L0/S \quad (1)'$$

where S represents a function having the mirror rotation angles (θH', θV') as variables.

However, the illuminance A also may be obtained by a sensor that receives the laser beam in a region having no influence on the displaying of the image on the exit window 106 to detect the light amount.

Then, the main controller 121 determines whether or not the calculated illuminance A is equal to or lower than the specific value A0 (Step 115). When the calculated illuminance A is equal to or lower than A0, the main controller 121 drives the scanning unit 105 based on (θH, θV)=(θH', θV') to display the image with the new size or aspect ratio (Step 116).

Next, the main controller 121 determines whether or not the scanning unit 105 is driven based on (θH, θV)=(θH', θV') (Step 117). When the scanning unit 105 is driven based on (θH, θV)=(θH', θV'), the main controller 121 returns to Step 108. When the scanning unit 105 is not driven based on (θH, θV)=(θH', θV'), the main controller 121 returns to Step 116.

On the other hand, when the illuminance A exceeds A0 in Step 115, the main controller 121 does not perform changing the mirror rotation angle to the new setting value (θH', θV') and warns that the image size cannot be reduced any more (Step 118). Then, the main controller 121 returns to Step 108.

The sequence of "change of the setting value of the rotation angle" described above can prevent the illuminance A at the exit window 106 from exceeding the specific value A0 by changing the size or aspect ratio of the displayed image.

When the power switch is turned off to shut the power of the apparatus 200 in Step 108, the main controller 121 enters the sequence of "stoppage" (Step 120).

First, the main controller 121 stores the current setting value (θH, θV) of the mirror rotation angle just before the power is turned on in the memory 122 as (θHm, θVm)=(θH, θV) (Step 121).

Next, the main controller 121 stops the driving of the laser light source (Step 122). Finally, the main controller 121 stops the operation of the scanning unit 105 (Step 123) to stop that of the apparatus 200.

As described above, according to this embodiment, the user can arbitrarily change the mirror rotation angle. Thus, even when the freedom degree of the installation location of the apparatus is low and the projection distance is difficulty changed, an image having an arbitrary size or aspect ratio can be easily displayed.

Furthermore, the mirror rotation angle is automatically controlled so that the illuminance A at the exit window 106 is prevented from exceeding the specific value A0. As a result, classification conditions for laser products specified by the standards can be satisfied.

Embodiment 2

Figure 5:
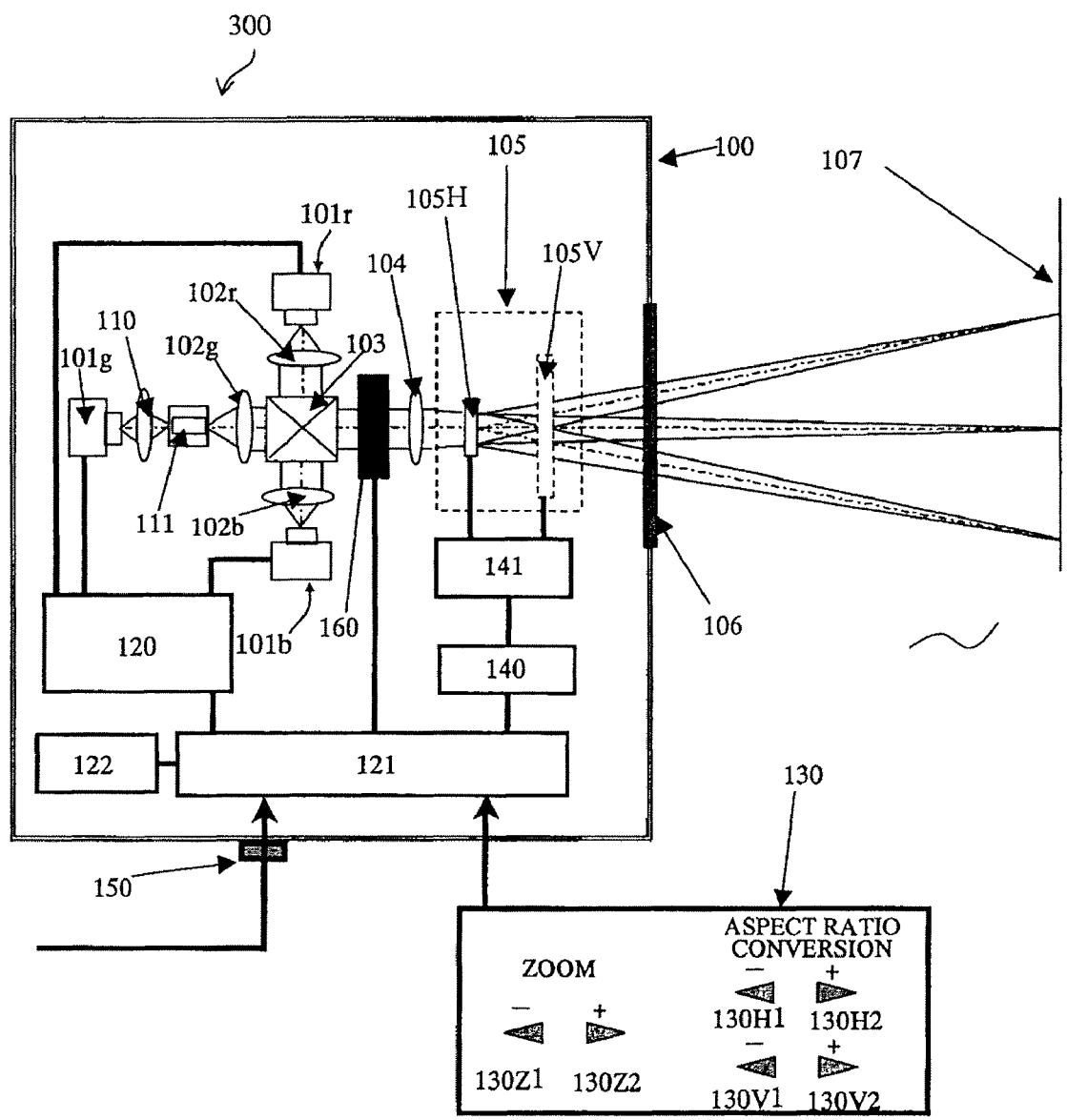
FIG. 5 is a block diagram showing the structure of a scanning image display apparatus that is Embodiment 2 of the present invention.

FIG. 5 shows the configuration of a scanning image display apparatus 300 that is Embodiment 2 of the present invention.

This embodiment is different from Embodiment 1 in that a light-amount adjusting unit 160 for adjusting the light amount L(W) of the laser beam is provided so that the brightness of the displayed image is fixed even when the size thereof is changed by the "zoom function" and the "aspect-ratio conversion function".

In this embodiment, the same components as those of Embodiment 1 are denoted with the same reference numerals as those of Embodiment 1.

The light-amount adjusting unit 160 is provided between the cross dichroic prism 103 and the collective lens 104. The light-amount adjusting unit 160 is a neutral density (ND) filter whose transmittance can be controlled by changing its applied voltage.

The main controller 121 determines the transmittance of the light-amount adjusting unit 160 and drives it so that the determined transmittance can be obtained.

The following section will describe a method for controlling the light amount by the main controller 121 and the light-amount adjusting unit 160 in this embodiment.

Figure 6:
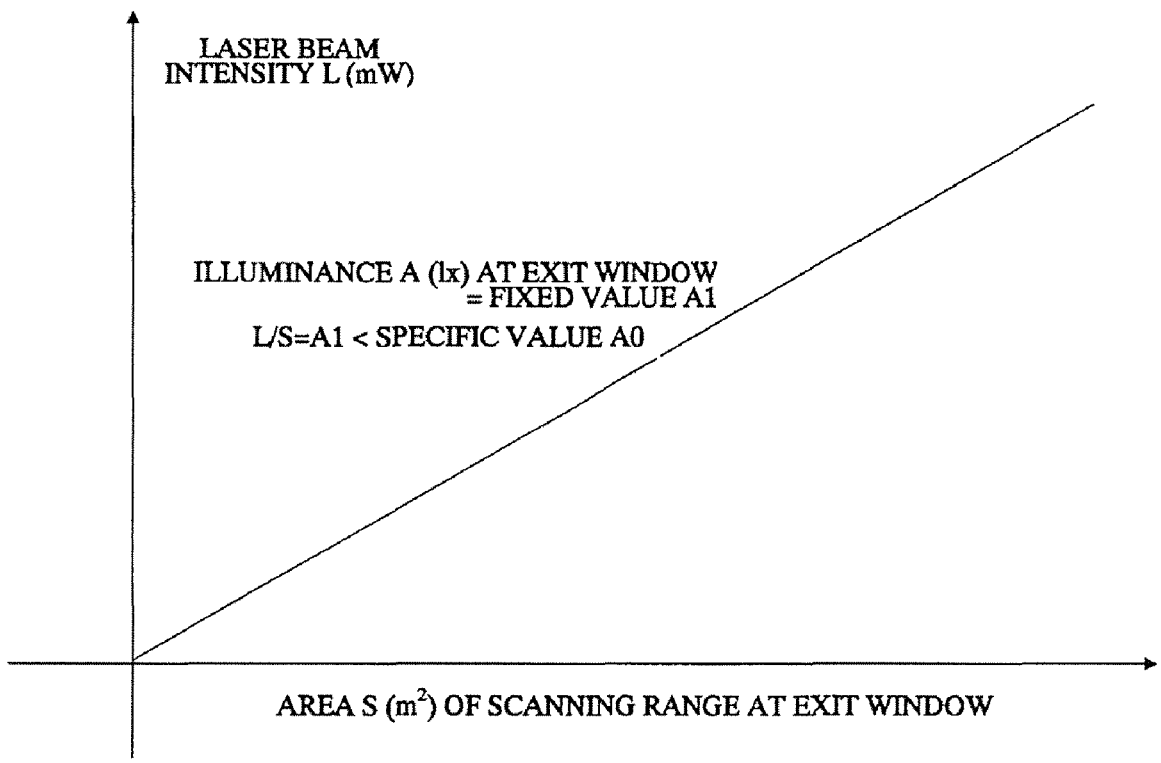
FIG. 6 shows a relationship among the area of a scanning region at an exit window, illuminance at the exit window and a light amount of a laser beam in Embodiment 2.

FIG. 6 shows a relationship between the area (scanning area) S(m2) of the scanning region at the exit window 106 and the illuminance A(lx) at the exit window 106 by a graph. The scanning area S at the exit window 106 is changed by the "zoom function" and the "aspect-ratio conversion function".

The scanning area S is calculated as a function of the mirror rotation angle (θH, θV) set by the main controller 121 and the rotation-angle setting circuit 140 based on the signal from the display condition input unit 130.

In this embodiment, the illuminance A(lx) at the exit window 106, the scanning area S(m2) at the exit window 106 and the light amount L(mW) of the laser beam are caused to have a relationship as shown below.

$$L/S = A = \text{a fixed value } A1 \leq \text{the specific value } A0 \quad (3)$$

Specifically, in this embodiment, the light amount L of the laser beam is determined so that the illuminance A at the exit window 106 becomes a value equal to the fixed value A1 that is equal to or lower than the specific value A0 described in Embodiment 1 even when the scanning area S (i.e., the size or aspect ratio of the image) is changed.

As a result, the brightness of the displayed image on the screen 107 can be maintained at a fixed level even when the size or aspect ratio of the image is changed.

As can be seen from expression (3), in order to fix the illuminance A at the exit window 106, the light amount L of the laser beam may be changed with respect to the scanning area S so that a proportional relationship is established therebetween.

For example, when the "zoom function" is used to enlarge the scanning area S to a value twice its initial value, the size or aspect ratio of the image can be changed while fixing the brightness of the displayed image by also increasing the light amount L of the laser beam to a value twice its initial value.

On the contrary, when the scanning area S is reduced to a value 0.5 times the initial value, the size or aspect ratio of the image can be changed while fixing the brightness of the displayed image by setting the light amount L of the laser beam to a value 0.5 times its initial value.

Figure 7:
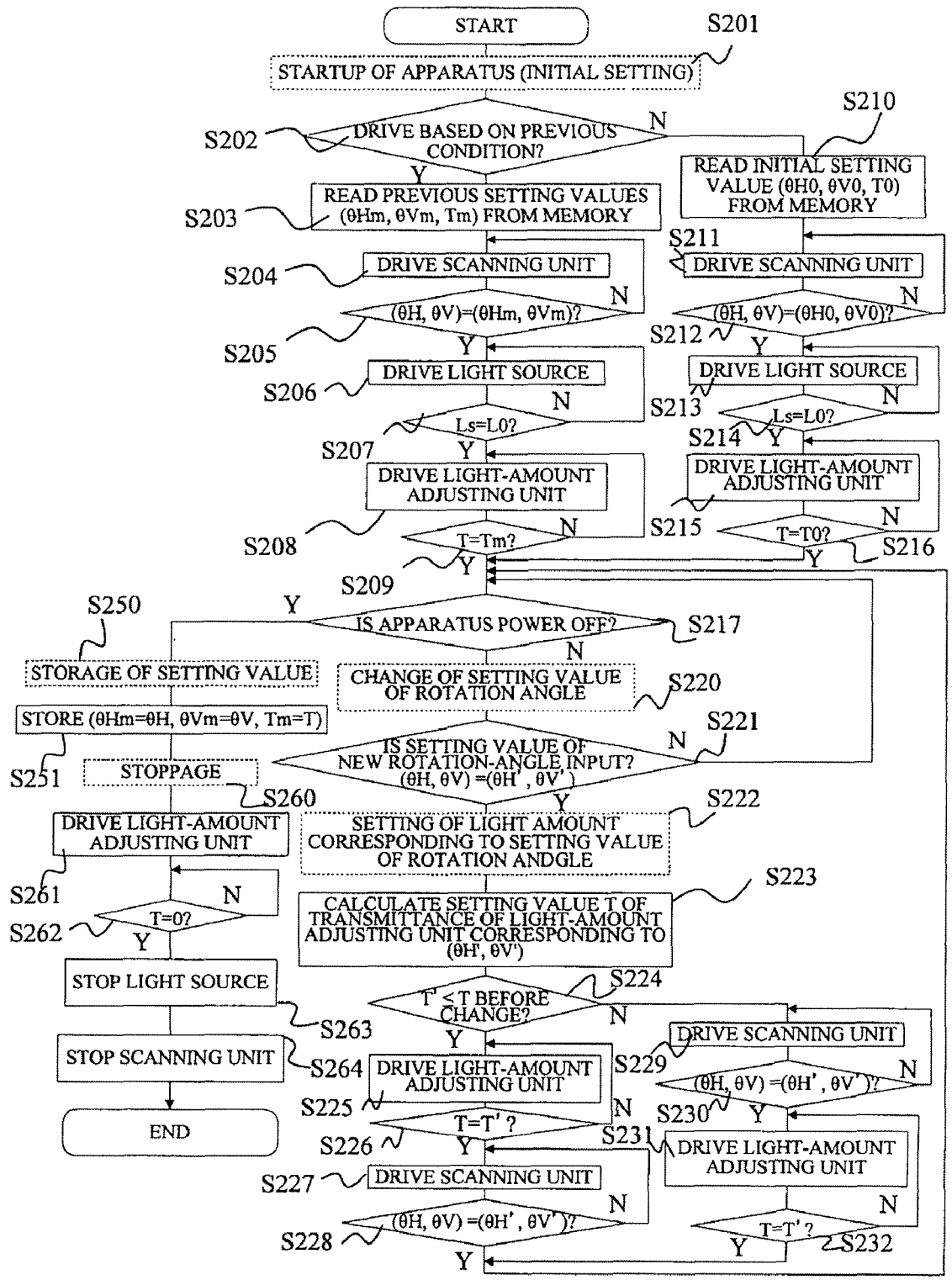
FIG. 7 is a flowchart showing the operation of the scanning image display apparatus of Embodiment 2.

FIG. 7 is a flowchart showing the operation of the main controller 121 in this embodiment.

Hereinafter, with reference to FIG. 7, operation sequences of "startup of the apparatus", "change of the setting value of the rotation angle", "setting of the light amount in accordance with the setting value of the rotation angle", "storage of the setting value" and "stoppage" will be described in this order.

When the power is turned on by the operation of the power switch (not shown), the main controller 121 enters the sequence of "startup of the apparatus" (Step 201). In this step, the main controller 121 causes the display device constituting the display condition input unit 130 to display a message asking the user to select whether or not the image is displayed based on the previous display condition.

The user selects whether or not the image is displayed based on the previous display condition or the image is displayed based on a condition corresponding to the initial setting value determined as the specification of the apparatus 300 by operating the selection button (not shown) (Step 202).

The initial setting value determined as the specification is stored in the memory 122 in the apparatus 300.

When the image is displayed based on the previous display condition, the main controller 121 reads the previous mirror rotation angle and the setting value of the transmittance of the light-amount adjusting unit 160 (θHm, θVm, Tm) from the memory 122 (Step 203).

Then, the main controller 121 sends the setting value to the scanning unit control circuit 141 to cause it to drive the scanning unit 105 based on (θH, θV)=(θHm, θVm) (Step 204).

Next, the main controller 121 confirms whether or not the scanning unit 105 is driven based on (θH, θV)=(θHm, θVm) (Step 205). When the scanning unit 105 is driven based on (θH, θV)=(θHm, θVm), the main controller 121 proceeds to Step 206. When the scanning unit 105 is not driven based on (θH, θV)=(θHm, θVm), the main controller 121 returns to Step 204.

Then, in Step 206, the main controller 121 drives the laser light source with the light amount of Ls=L0(mW) via the light-source driving circuit 120. The light amount L0 represents a value determined as the specification of the apparatus 300.

Then, the main controller 121 confirms whether or not the light amount of the laser light source is L0 (Step 207). When the light amount of the laser light source is not L0, the main controller 121 returns to Step 206. When the light amount of the laser light source is L0, the main controller 121 proceeds to Step 208.

In Step 208, the main controller 121 drives the light-amount adjusting unit 160 so that its transmittance T becomes a setting value Tm to display the image on the screen 107.

Next, the main controller 121 confirms that the transmittance T of the light-amount adjusting unit 160 is the setting value Tm (Step 209). Thereafter, the main controller 121 proceeds to Step 217.

When the image is not displayed based on the previous display condition in Step 202, the main controller 121 reads the initial setting values of the mirror rotation angle and the transmittance of the light-amount adjusting unit 160 (θH0, θV0,T0) from the memory 122 (Step 210).

Then, the main controller 121 sends the initial setting values to the scanning unit control circuit 141 to drive the scanning unit 105 based on the condition of (θH, θV)=(θH0, θV0) (Step 211).

Next, the main controller 121 confirms whether or not the scanning unit 105 is driven based on the condition of (θH, θV)=(θH0, θV0) (Step 212).

When the scanning unit 105 is driven based on the condition of (θH, θV)=(θH0, θV0), the main controller 121 proceeds to Step 213. When the scanning unit 105 is not driven based on the condition of (θH, θV)=(θH0, θV0), the main controller 121 returns to Step 211.

In Step 213, the main controller 121 drives the laser light source with a light amount Ls=L0 (mW) via the light-source driving circuit 120.

Then, the main controller 121 confirms whether or not the light amount of the laser light source is L0 (Step 214). When the light amount of the laser light source is not L0, the main controller 121 returns to Step 213. When the light amount of the laser light source L0, the main controller 121 proceeds to Step 215.

In Step 215, the main controller 121 drives the light-amount adjusting unit 160 so that its transmittance T becomes a value equal to an initial setting value T0 to display the image on the screen 107.

Next, the main controller 121 confirms that the transmittance T of the light-amount adjusting unit 160 is the initial setting value T0 (Step 216) to subsequently proceed to Step 217.

In Step 217, the main controller 121 determines whether or not the power of the apparatus 300 is turned off by the operation of the power switch. When the power of the apparatus is not turned off, the main controller 121 enters the sequence of "change of the setting value of the rotation angle" (Step 220).

First, the main controller 121 is in a state of waiting for the input of the mirror rotation angle. Then, the main controller 121 determines whether or not a zoom instruction or an aspect ratio changing instruction generated by the operation of the display condition input button of the display condition input unit 130 (Step 221).

When the zoom instruction or the aspect ratio changing instruction is input, the main controller 121 causes the rotation-angle setting circuit 140 to calculate a new mirror rotation angle (θH', θV') in accordance with the instruction.

Next, the main controller 121 enters the sequence of "setting of the light amount in accordance with the setting value of the rotation angle" (Step 222).

First, the main controller 121 calculates the transmittance T' of the light-amount adjusting unit 160 corresponding to the new mirror rotation angle (θH', θV') (Step 223). This transmittance T' also may be read from the memory 122 that stores the relationship of the mirror rotation angle (θH', θV') and the transmittance T'.

Then, the main controller 121 determines whether or not the calculated transmittance T' is equal to or lower than the transmittance T before the change (Step 224).

When T'≦T is established, that is, when the illuminance A at the exit window 106 is higher than the fixed value A1 shown in the graph of FIG. 6 if the transmittance T before the change remains, the main controller 121 firstly drives the light-amount adjusting unit 160 so that its transmittance becomes T' (Step 225).

Then, after confirming that the transmittance is T' (Step 226), the main controller 121 drives the scanning unit 105 based on (θH, θV)=(θH', θV') (Step 227). Next, the main controller 121 determines whether or not the scanning unit 105 is driven based on (θH, θV)=(θH', θV') (Step 228).

When the scanning unit 105 is driven based on (θH, θV)=(θH', θV'), the main controller 121 returns to Step 217. When the scanning unit 105 is not driven based on (θH, θV)=(θH', θV'), the main controller 121 returns to Step 227.

On the other hand, when T'>T is established in Step 224, that is, when the illuminance A at the exit window 106 is lower than the fixed value A1 if the transmittance T before the change remains, the main controller 121 firstly drives the scanning unit 105 based on (θH, θV)=(θH', θV') (Step 229).

Then, the main controller 121 determines whether or not the scanning unit 105 is driven based on (θH, θV)=(θH', θV') (Step 230). When the scanning unit 105 is driven based on (θH', θV'), the main controller 121 proceeds to Step 231. When the scanning unit 105 is not driven based on (θH', θV'), the main controller 121 returns to Step 229.

In Step 231, the main controller 121 drives the light-amount adjusting unit 160 so that its transmittance is T'. Then, the main controller 121 confirms that the transmittance becomes T' (Step 232). Then, the main controller 121 returns to Step 217.

As described above, in this embodiment, based on whether or not the transmittance T' of the light-amount adjusting unit 160 corresponding to the new mirror rotation angle (θH', θV') is equal to or lower than the previous transmittance T, the order of driving the light-amount adjusting unit 160 and the scanning unit 105 is changed.

In other words, the order of driving the scanning unit 105 and the light-amount adjusting unit 160 is determined based on the illuminance at the exit window 106 determined depending on the mirror rotation angle and the transmittance of the light-amount adjusting unit 160 after the change.

As a result, the illuminance A at the exit window 106 can be prevented from increasing to a value exceeding the fixed value A1 (the specific value A0).

When the power switch is operated to turn the power of the apparatus off in Step 217, the main controller 121 enters the sequence of "storage of the setting value" (Step 250).

The main controller 121 stores the mirror rotation angle and the setting value (θH, θV, T) of the transmittance just before the power is turned off as (θHm, θVm, Tm)=(θH, θV, T) in the memory 122 (Step 251).

Next, the main controller 121 performs the sequence of "stoppage" (Step 260). First, the main controller 121 drives the light-amount adjusting unit 160 to cause the transmittance thereof to be minimum (e.g., 0%).

Then, after the main controller 121 confirms that the transmittance of the light-amount adjusting unit 160 is the minimum value (Step 262), the main controller 121 stops the driving of the laser light source (Step 263). Finally, the main controller 121 stops the operation of the scanning unit 105 (Step 264) to stop the operation of the apparatus 300.

In this embodiment, the case was described where the light-amount adjusting unit 160 is provided between the cross dichroic prism 103 and the collective lens 104.

However, the location of the light-amount adjusting unit 160 is not limited thereto. The light-amount adjusting unit 160 may be provided at any position between the laser devices 101b, 101g and 101r and the exit window 106.

However, when the light-amount adjusting unit 160 is provided closer to the laser light source than the cross dichroic prism 103, it is necessary that the white balance of red, blue and green laser light fluxes is maintained at a fixed level when the light amount is adjusted.

Furthermore, in this embodiment, the variable ND filter was used as the light-amount adjusting unit 160 to control the light amount of the laser beam. However, the light amount also may be adjusted by electrically controlling laser driving conditions. it is also necessary for this case to maintain the white balance of red, blue and green laser light fluxes to a fixed level.

The upper limit value of the mirror rotation angle in this embodiment may be determined, similarly as in Embodiment 1, depending on the maximum mechanically rotatable angle of the mirror or the shape of the exit window 106 (shape for preventing the scanned laser beam from being interfered by the periphery of the exit window 106).

When the scanning area S reaches the upper limit value, the main controller 121 does not perform image enlargement processing (processing for increasing the mirror rotation angle) even when the display condition input buttons 130Z2, 130H2 and 130V2 are operated.

Further, in such a state, the main controller 121 performs a warning operation to indicate the user that the image cannot be enlarged any more.

As described above, according to this embodiment, even when the mirror rotation angle is changed to arbitrarily select the size or aspect ratio of the image, the brightness of the displayed image can be automatically maintained to a fixed level (but in a range satisfying laser product classification conditions specified by the standards).

Embodiment 3

Figure 8:
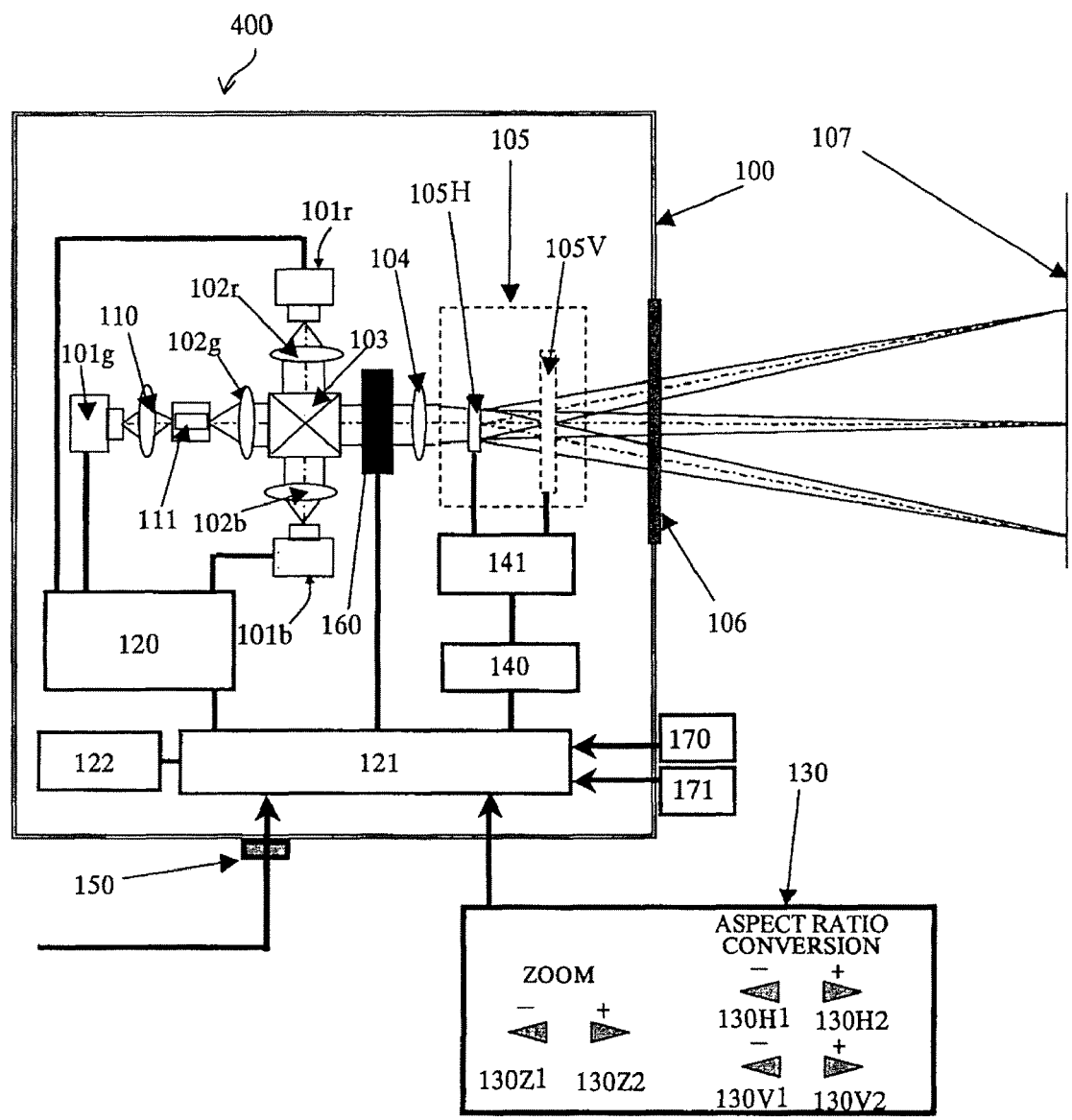
FIG. 8 is a block diagram showing the configuration of a scanning image display apparatus that is Embodiment 3 of the present invention.

FIG. 8 shows the configuration of a scanning image display apparatus 400 that is Embodiment 3 of the present invention.

This embodiment is a modification of Embodiment 2 and is different from Embodiments 1 and 2 in that a function is provided which automatically sets the illuminance of the displayed image at the screen 107 to the illuminance A_image (lx) suitable for the background illuminance A_back(lx) on the screen 107 in use environment.

In this embodiment, the same components as those of Embodiment 2 are denoted with the same reference numerals as those of Embodiment 2.

The scanning image display apparatus 400 of this embodiment has a projection distance detection unit (distance detector) 170 and a background illuminance detection unit (background illuminance detector) 171.

In this embodiment, these detection units 170 and 171 are placed at the outer side of the housing 100. However, these detection units 170 and 171 may be placed at the inner side of the housing 100.

The projection distance detection unit 170 and the background illuminance detection unit 171 are electrically connected to the main controller 121.

The projection distance detection unit 170 detects a projection distance d(m) between the apparatus 400 (more specifically, the exit window 106) and the screen 107. A method of detecting the projection distance d may be a known distance measurement method such as a phase difference detection method (triangulation method).

The main controller 121 calculates the illuminance A_image(lx) of the displayed image at the screen 107 based on the current setting value of the mirror rotation angle (θH, θV), the current light amount L (mW) of the laser beam and the current projection distance d.

The background illuminance detection unit 171 detects the background illuminance A_back(lx) at the screen 107.

The contrast C of the displayed image can be represented as in expression (4) based on A_back(lx) and A_image(lx).

$$C = (A\_back(lx) + A\_image(lx))/A\_back(lx) \quad (4)$$

In this embodiment, the light amount L of the laser beam is automatically set so that the contrast C becomes a certain value (e.g., C=3).

Figure 9:
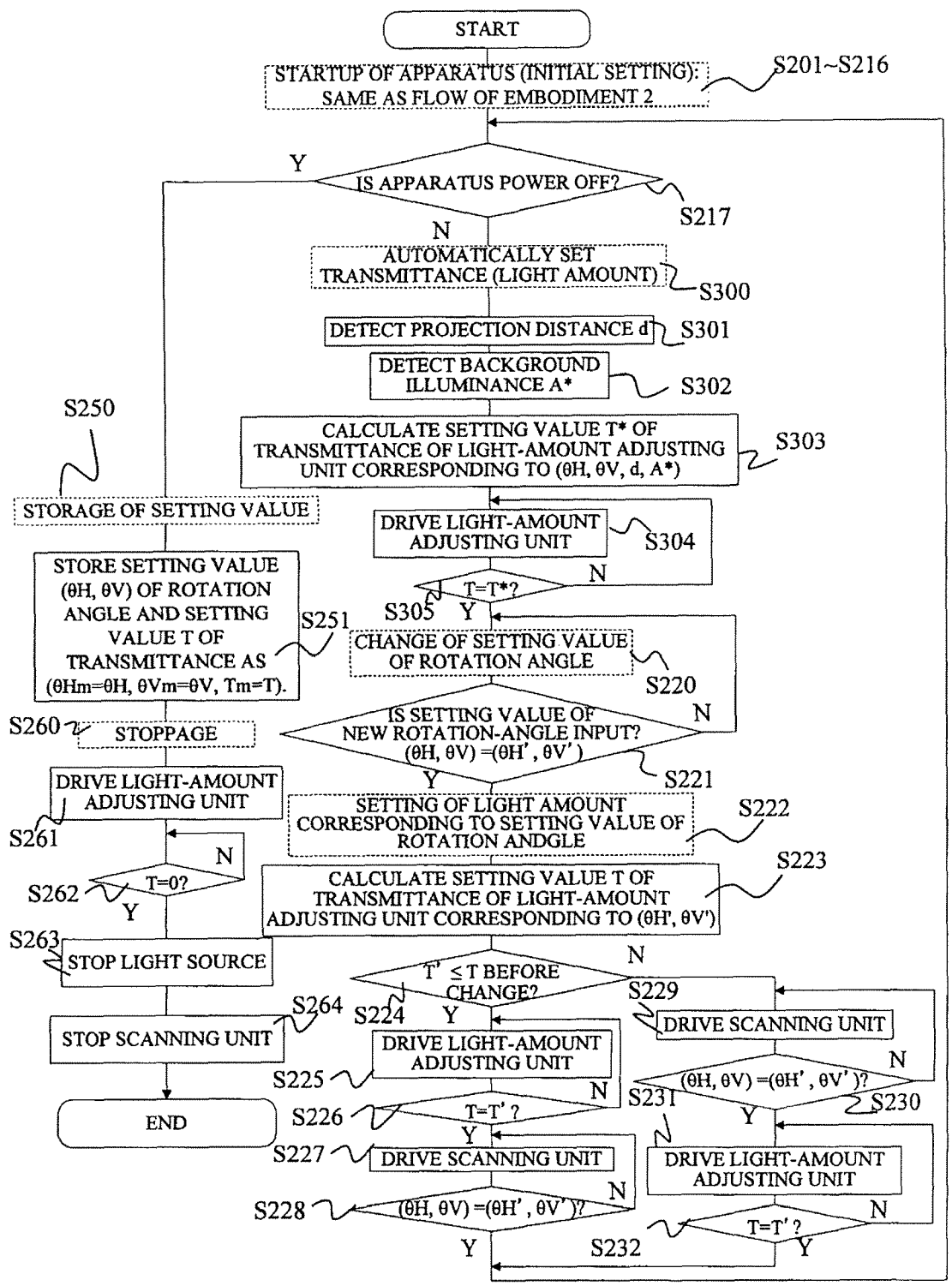
FIG. 9 is a flowchart showing the operation of the scanning image display apparatus of Embodiment 3.

FIG. 9 is a flowchart showing the operation of the main controller 121 in this embodiment.

With reference to FIG. 9, the operation sequences will be described in an order of "startup of the apparatus", "automatic setting of the transmittance (light amount) corresponding to the background illuminance", "change of the setting value of the rotation angle", "setting of the light amount in accordance with the setting value of the rotation angle", "storage of the setting value" and "stoppage".

The sequence of "startup of the apparatus" (Steps 201 to 216) is the same as that of Embodiment 2. When the main controller 121 determines that the power of the apparatus 400 is not turned off in Step 217, the main controller 121 enters the sequence of "automatic setting of the transmittance (light amount) corresponding to the background illuminance" (Step 300).

First, the main controller 121 detects the projection distance d through the projection distance detection unit 170 (Step 301). Next, the main controller 121 detects a background illuminance A* on the screen 107 through the background illuminance detection unit 171 (Step 302).

Next, the main controller 121 calculates the transmittance T* of the light-amount adjusting unit 160 that corresponds to the setting value of the mirror rotation angle and the detection results of the projection distance and the background illuminance ($\theta H$, $\theta V$, d, A*) (Step 303).

This transmittance T* may be read from the memory 122 that stores the relationship between the transmittance T* and the setting value of the mirror rotation angle, the projection distance and the background illuminance ($\theta H$, $\theta V$, d, A*).

Next, the main controller 121 drives the light-amount adjusting unit 160 so that the transmittance becomes T* (Step 304).

Then, after the main controller 121 confirms that the transmittance is the transmittance T* (Step 305), the main controller 121 enters the sequences of "change of the setting value of the rotation angle" (Steps 220 and 221) and "setting of the light amount in accordance with the setting value of the rotation-angle" (Steps 222 to 232), which were described in Embodiment 2.

When the main controller 121 completes the sequence of "setting of the light amount in accordance with the setting value of the rotation-angle", the main controller 121 performs Step 217 to reenters the sequence of "automatic setting of the transmittance (light amount) corresponding to the background illuminance".

When the projection distance d or the background illuminance A* changes, in response to the change the main controller 121 changes the transmittance T* of the light-amount adjusting unit 160.

When the main controller 121 determines that the power of the apparatus 400 is turned off in Step 217, the main controller 121 performs the sequence of "storage of the setting value" (Steps 250 and 251) as in Embodiment 2 to perform the sequence of "stoppage" (Steps 260 to 264), thereby completing the operation of the apparatus 400.

In this embodiment, the scanning area S at the exit window 106, that is, the upper limit value of the mirror rotation angle may be determined depending on, for example, the maximum mechanically rotatable angle of the mirror or the shape of the exit window 106 (shape for preventing the scanned laser beam from being interfered by the periphery of the exit window 106).

When the scanning area S reaches the upper limit value, the main controller 121 does not perform the image enlargement processing (processing for increasing the mirror rotation angle) even though the display condition input buttons 130Z2, 130H2 and 130V2 are operated.

Further, in such a state, the main controller 121 also performs a warning operation to indicate the user that the image cannot be enlarged any more.

In this embodiment, the description was made of the case where the contrast C is 3 (fixed value). However, a contrast condition input unit (not shown) may be provided so that a contrast value arbitrarily input by the user as a display condition is set as C, for example.

In this case, it is necessary to provide an upper limit for the setting value of the contrast C to prevent the illuminance A at the exit window 106 from exceeding the fixed value A1 (the specific value A0).

Allowing the scanning image display apparatus to have the contrast adjustment function as described above enables the user to arbitrarily change the brightness and contrast of the displayed image.

As described above, according to this embodiment, even when the mirror rotation angle is changed, the brightness of the displayed image can be automatically set so as to be suitable for the brightness of the use environment or capable of providing a user's arbitrary contrast.

According to the respective embodiments as described above, changing the rotation angle of the mirror in accordance with the operation by the user can variably set the scanning region of the light flux (i.e., the size or aspect ratio of the image).

Therefore, the user can select an arbitrary image size or aspect ratio without changing the projection distance. Furthermore, the mirror is not required to be driven in a rotation angle range not contributing to the display of the image, thus providing power saving.

Furthermore, changing the image size without using trimming can fix the number of displaying pixels, regardless of the image size.

Furthermore, the present invention is not limited to these embodiments and various variations and modifications may be made without departing from the scope of the present invention.

This application claims foreign priority benefits based on Japanese Patent Application No. 2006-328800, filed on Dec. 5, 2006, which is hereby incorporated by reference herein in its entirety as if fully set forth herein.

What is claimed is:

1. A scanning image display apparatus, comprising:
a light source;
a scanning unit rotating a mirror to scan a light flux from the light source;
an input unit operated by a user to input a display condition of an image;
a controller changing a rotation angle of the mirror in the scanning unit in accordance with a signal from the input unit;
a light-amount adjusting unit changing a light amount of the light flux; and
a housing that stores therein the light source, the scanning unit and the light-amount adjusting unit, and that has an exit aperture through which the light flux exiting from the scanning unit to outside passes,
wherein the controller calculates the illuminance at the exit aperture based on the rotation angle of the mirror and a transmittance of the light-amount adjusting unit, and controls the light-amount adjusting unit so that the illuminance is not changed even when the rotation angle is changed.

2. A scanning image display apparatus according to claim 1, wherein the display condition is a size, an aspect ratio, or a contrast of the displayed image.

3. A scanning image display apparatus according to claim 1, further comprising a housing that stores therein the light source and the scanning unit, and that has an exit aperture through which the light flux exiting from the scanning unit to outside passes, wherein the controller calculates an illuminance at the exit aperture and limits the rotation angle of the mirror so that the illuminance becomes equal to or lower than a specific value.

4. A scanning image display apparatus according to claim 1, further comprising:
a light-amount adjusting unit changing a light amount of the light flux; and
a housing that stores therein the light source, the scanning unit and the light-amount adjusting unit, and that includes an exit aperture through which the light flux exiting from the scanning unit to outside passes,
wherein the controller calculates an illuminance at the exit aperture and controls the light-amount adjusting unit so that the illuminance becomes equal to or lower than a specific value.

5. A scanning image display apparatus according to claim 4, wherein, when the rotation angle of the mirror is changed, the controller determines an order for driving the scanning unit and the light-amount adjusting unit based on the illuminance at the exit aperture obtained after the change of the rotation angle.

6. A scanning image display apparatus according to claim 5, wherein,
when the rotation angle of the mirror is changed, the controller calculates a transmittance of the light-amount adjusting unit corresponding to the rotation angle after the change thereof,
when the transmittance is increased, the controller changes the rotation angle of the mirror and then drives the light-amount adjusting unit, and when the transmittance is decreased, the controller drives the light-amount adjusting unit and then changes the rotation angle of the mirror.

7. A scanning image display apparatus according to claim 1, further comprising:
a light-amount adjusting unit changing a light amount of the light flux;
a distance detector detecting a distance to a display surface at which the image is displayed; and
a background illuminance detector detecting a background illuminance at the display surface,
wherein the controller controls the light-amount adjusting unit based on the detected distance and detected background illuminance and the rotation angle of the mirror in the scanning unit.

8. An image display system, comprising:
a scanning image display apparatus according to claim 1; and
an image supply apparatus supplying an image signal to the scanning image display apparatus.

9. A scanning image display apparatus, comprising:
a light source;
a scanning unit rotating a mirror to scan a light flux from the light source;
an input unit operated by a user to input a display condition of an image;
a controller changing a rotation angle of the mirror in the scanning unit in accordance with a signal from the input unit;
a light-amount adjusting unit changing a light amount of the light flux; and
a housing that stores therein the light source, the scanning unit and the light-amount adjusting unit, and that includes an exit aperture through which the light flux exiting from the scanning unit to outside passes,
wherein the controller calculates an illuminance at the exit aperture and controls the light-amount adjusting unit so that the illuminance becomes equal to or lower than a specific value,
wherein,
when the rotation angle of the mirror is changed, the controller (a) determines an order for driving the scanning unit and the light-amount adjusting unit based on the illuminance at the exit aperture obtained after the change of the rotation angle, and (b) calculates a transmittance of the light-amount adjusting unit corresponding to the rotation angle after the change thereof,
when the transmittance is increased, the controller changes the rotation angle of the mirror and then drives the light-amount adjusting unit, and
when the transmittance is decreased, the controller drives the light-amount adjusting unit and then changes the rotation angle of the mirror.

10. An image display system, comprising:
a scanning image display apparatus according to claim 9; and
an image supply apparatus supplying an image signal to the scanning image display apparatus.

* * * * *